US012505792B2

(12) United States Patent
Zen et al.

(10) Patent No.: US 12,505,792 B2
(45) **Date of Patent: *Dec. 23, 2025**

(54) SIGNAL PROCESSING APPARATUS, SIGNAL PROCESSING METHOD, AND DISPLAY APPARATUS

(71) Applicant: SATURN LICENSING LLC, New York, NY (US)

(72) Inventors: Masao Zen, Chiba (JP); Syunsuke Kikuchi, Aichi (JP); Daisuke Miki, Tokyo (JP); Kazuhiro Nukiyama, Kanagawa (JP); Kazutaka Kobayashi, Kanagawa (JP); Yasushi Konuma, Kanagawa (JP); Kazuki Uchida, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/889,518

(22) Filed: Sep. 19, 2024

(65) Prior Publication Data

US 2025/0087144 A1 Mar. 13, 2025

Related U.S. Application Data

(63) Continuation of application No. 18/238,606, filed on Aug. 28, 2023, now Pat. No. 12,131,692, which is a (Continued)

(30) Foreign Application Priority Data

May 1, 2020 (JP) ................................ 2020-081151

(51) Int. Cl.
*G09G 3/3208* (2016.01)

(52) U.S. Cl.
CPC ... *G09G 3/3208* (2013.01); *G09G 2320/0233* (2013.01); *G09G 2320/041* (2013.01); *G09G 2320/046* (2013.01); *G09G 2360/16* (2013.01)

(58) Field of Classification Search
CPC ......... G09G 3/3208; G09G 2320/0233; G09G 2320/041; G09G 2320/046; G09G 2360/16
See application file for complete search history.

(56) References Cited

U.S. PATENT DOCUMENTS 6,897,855 B1 * 5/2005 Matthies .............. H01L 25/167 345/206
7,126,562 B1 * 10/2006 Irie ...................... G09G 3/2944 345/63
(Continued)

FOREIGN PATENT DOCUMENTS

CN 101373575 2/2009
CN 101582240 11/2009
(Continued)

OTHER PUBLICATIONS

International Search Report for Application No. PCT/JP2021/015796 mailed Jun. 22, 2021, pp. 1-3.

*Primary Examiner* — Gene W Lee
(74) *Attorney, Agent, or Firm* — Richard LaPeruta

(57) ABSTRACT

The present technology relates to a signal processing apparatus, a signal processing method, and a display apparatus that may reduce the effect of deterioration in element of a display panel. Provided is a signal processing apparatus including a signal processing unit configured to acquire, in changing a video signal from a low luminance display signal to a high luminance display signal by luminance enhancement, an accumulated load increase amount obtained by measuring and accumulating amounts of increase in load on a display panel caused by luminance enhancement, and
(Continued)

adaptively control, in reference to the accumulated load increase amount acquired, a first gain for improving luminance of the video signal, according to a degree of effect of deterioration in element of the display panel. The present technology is applicable to self-luminous display apparatuses, for example.

20 Claims, 7 Drawing Sheets

Related U.S. Application Data continuation of application No. 17/919,631, filed as application No. PCT/JP2021/015796 on Apr. 19, 2021, now Pat. No. 11,790,843.

(56) References Cited

U.S. PATENT DOCUMENTS

| | | | | |
|---|---|---|---|---|
| 7,274,363 | B2 * | 9/2007 | Ishizuka | G09G 3/3233 345/211 |
| 7,847,764 | B2 * | 12/2010 | Cok | H05B 45/60 315/169.3 |
| 11,217,164 | B2 * | 1/2022 | Kim | H04N 5/57 |
| 11,551,601 | B2 | 1/2023 | Ahn et al. | |
| 11,790,819 | B2 * | 10/2023 | Hu | G09G 3/32 345/84 |
| 2003/0201727 | A1 * | 10/2003 | Yamazaki | G09G 3/3291 315/169.1 |
| 2007/0182670 | A1 | 8/2007 | Watanabe et al. | |
| 2009/0213272 | A1 | 8/2009 | Suzuki | |
| 2012/0154683 | A1 | 6/2012 | Yamashita et al. | |
| 2013/0229447 | A1 | 9/2013 | Ihata et al. | |
| 2014/0168039 | A1 | 6/2014 | Kim et al. | |
| 2014/0176403 | A1 | 6/2014 | Inoue et al. | |
| 2016/0086548 | A1 | 3/2016 | Maeyama et al. | |
| 2017/0076661 | A1 | 3/2017 | Zhang et al. | |
| 2017/0213496 | A1 | 7/2017 | Hsu et al. | |
| 2020/0372860 | A1 | 11/2020 | Kim et al. | |

FOREIGN PATENT DOCUMENTS

| | | |
|---|---|---|
| CN | 103871360 | 6/2014 |
| CN | 103871364 | 6/2014 |
| CN | 105144273 | 12/2015 |
| EP | 2028637 | 2/2009 |
| EP | 2743908 | 6/2014 |
| JP | 2007286458 | 11/2007 |
| JP | 2009075563 | 4/2009 |
| JP | 2014013335 | 1/2014 |
| JP | 2014123126 | 7/2014 |
| JP | 2015094795 | 5/2015 |
| KR | 20090021080 | 2/2009 |
| KR | 20140078500 | 6/2014 |
| KR | 20150114524 | 10/2015 |
| KR | 20190030534 | 3/2019 |
| KR | 20200019321 | 2/2020 |
| WO | 2014188813 | 11/2014 |
| WO | 2019229971 | 12/2019 |

* cited by examiner

SIGNAL PROCESSING APPARATUS, SIGNAL PROCESSING METHOD, AND DISPLAY APPARATUS

CROSS REFERENCE TO RELATED APPLICATIONS

The present application is a continuation of U.S. patent application Ser. No. 17/919,631 filed on Oct. 18, 2022, which is a national phase entry under 35 U.S.C. § 371 of International Application No. PCT/JP2021/015796 filed on Apr. 19, 2021, published as WO 2021/220854, which claims priority from Japanese Patent Application No. 2020-081151 filed on May 1, 2020, all of which are hereby incorporated herein by reference in their entireties.

TECHNICAL FIELD

The present technology relates to a signal processing apparatus, a signal processing method, and a display apparatus, and in particular, to a signal processing apparatus, a signal processing method, and a display apparatus that can reduce the effect of deterioration in element of a display panel.

BACKGROUND ART

In recent years, self-luminous display apparatuses such as OLED display apparatuses are on the verge of becoming the mainstream of display devices configured to display video. For example, JP 2015-94795 discloses a technology for enhancing the luminance of a display panel as a technology relating to display apparatuses such as self-luminous display apparatuses.

SUMMARY

Incidentally, in respect of display apparatuses, it is demanded to reduce, in enhancing the luminance of the display panel, the effect of deterioration in element of the display panel.

The present technology has been made in view of such a circumstance and makes it possible to reduce the effect of deterioration in element of a display panel.

According to an aspect of the present technology, there is provided a signal processing apparatus including a signal processing unit configured to acquire, in changing a video signal from a low luminance display signal to a high luminance display signal by luminance enhancement, an accumulated load increase amount obtained by measuring and accumulating amounts of increase in load on a display panel caused by luminance enhancement, and adaptively control, in reference to the accumulated load increase amount acquired, a first gain for improving luminance of the video signal, according to a degree of effect of deterioration in element of the display panel.

According to an aspect of the present technology, there is provided a signal processing method including, by a signal processing apparatus, acquiring, in changing a video signal from a low luminance display signal to a high luminance display signal by luminance enhancement, an accumulated load increase amount obtained by measuring and accumulating amounts of increase in load on a display panel caused by luminance enhancement, and adaptively controlling, in reference to the accumulated load increase amount acquired, a first gain for improving luminance of the video signal, according to a degree of effect of deterioration in element of the display panel.

In the signal processing apparatus and the signal processing method according to the aspects of the present technology, in changing a video signal from a low luminance display signal to a high luminance display signal by luminance enhancement, an accumulated load increase amount obtained by measuring and accumulating amounts of increase in load on the display panel caused by luminance enhancement is acquired, and in reference to the accumulated load increase amount acquired, a first gain for improving luminance of the video signal is adaptively controlled according to a degree of effect of deterioration in element of the display panel.

According to an aspect of the present technology, there is provided a display apparatus including a panel unit including a display panel, and a signal processing unit configured to process a video signal, in which the signal processing unit is configured to acquire, in changing the video signal from a low luminance display signal to a high luminance display signal by luminance enhancement, an accumulated load increase amount obtained by measuring and accumulating amounts of increase in load on the display panel caused by luminance enhancement, and adaptively control, in reference to the accumulated load increase amount acquired, a first gain for improving luminance of the video signal, according to a degree of effect of deterioration in element of the display panel.

In the display apparatus according to the aspect of the present technology, in changing a video signal from a low luminance display signal to a high luminance display signal by luminance enhancement, an accumulated load increase amount obtained by measuring and accumulating amounts of increase in load on the display panel caused by luminance enhancement is acquired, and in reference to the accumulated load increase amount acquired, a first gain for improving luminance of the video signal is adaptively controlled according to a degree of effect of deterioration in element of the display panel.

The signal processing apparatus and the display apparatus according to the aspects of the present technology may be independent apparatuses or internal blocks of a single apparatus.

DETAILED DESCRIPTION

1. Embodiment of Present Technology

Technologies for enhancing the luminance of display apparatuses such as OLED display apparatuses include the technology that detects a video signal being switched from a low luminance display signal (low luminance signal) to a high luminance display signal (high luminance signal) and controls the luminance improvement gain in reference to the increasing integrated value (see PTL 1 described above).

Figure 1:
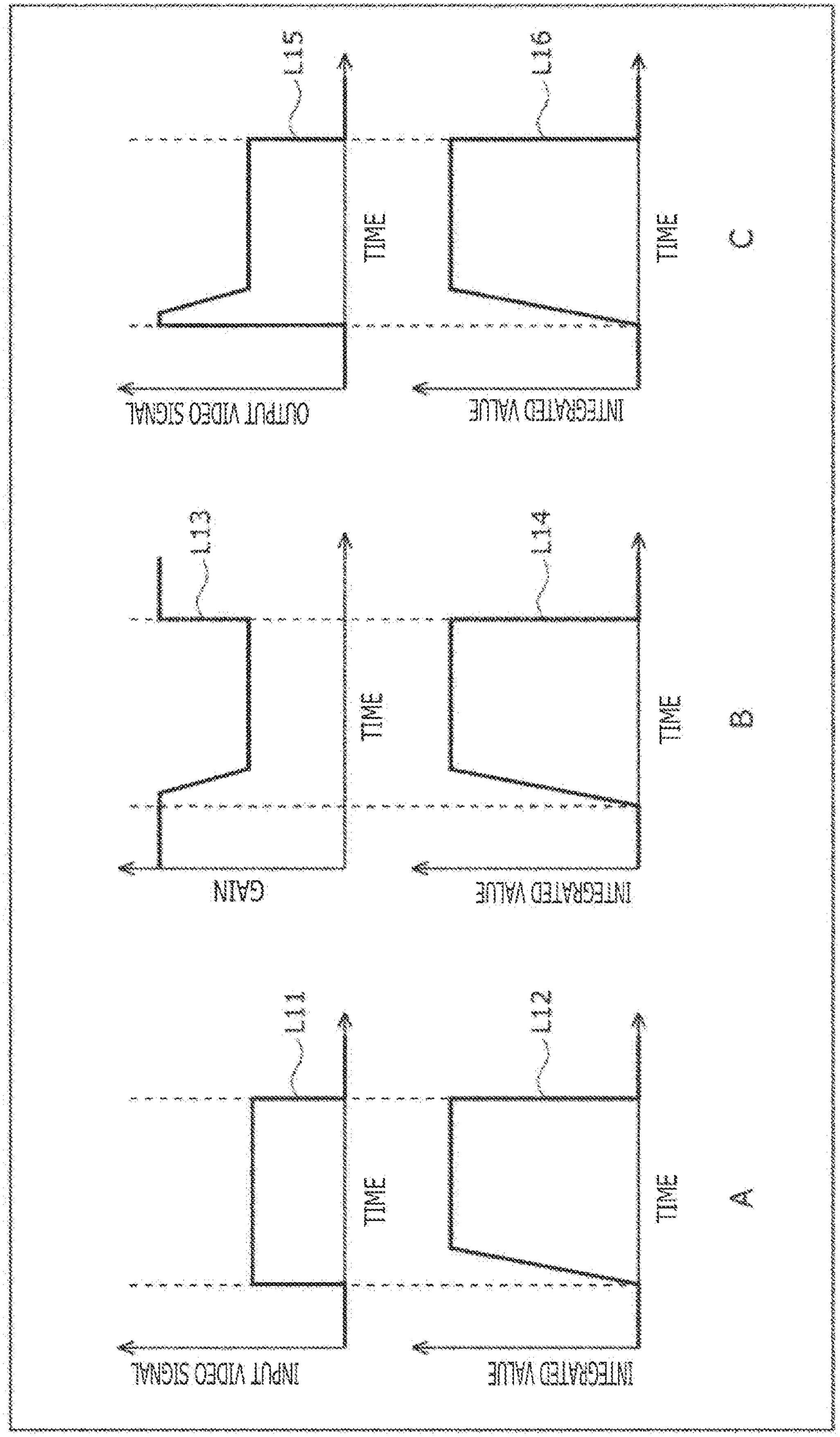
FIG. 1 depicts diagrams illustrating exemplary luminance enhancement processing.

FIG. 1 illustrates exemplary luminance enhancement processing to which such a luminance enhancement technology is applied. In FIG. 1, A illustrates a relation between an input video signal and an integrated value by a thick line L11 and a thick line L12 on the same time axis.

In FIG. 1, B illustrates a relation between a gain by which an input video signal is multiplied and an integrated value by a thick line L13 and a thick line L14 on the same time axis. In FIG. 1, C illustrates a relation between an output video signal obtained by multiplying an input video signal by a gain and an integrated value by a thick line L15 and a thick line L16 on the same time axis.

In a case where luminance enhancement processing illustrated in FIG. 1 is used, each period of luminance improvement for a high luminance signal can be controlled. Even when each period is short, however, the accumulated luminance improvement time is increased along with the continuous use of the display panel over a long period of time. As a result, there arises a problem in that burn-in or the like occurs due to element deterioration in the display panel of the display apparatus.

The present technology proposes a technique for solving a problem in terms of the long-term reliability of a display panel such as burn-in caused by a problematic element deterioration that occurs in enhancing the luminance of the display panel as described above. Now, with reference to the drawings, an embodiment of the present technology is described.

(Apparatus Configuration)

Figure 2:
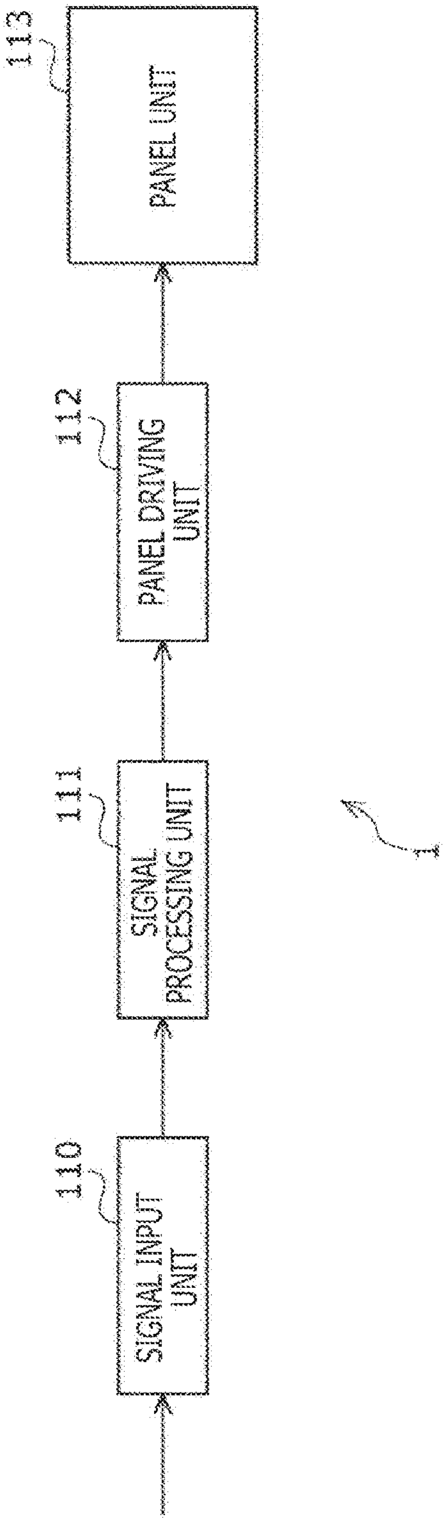
FIG. 2 is a block diagram illustrating a configuration example of a display apparatus of an embodiment to which the present technology is applied.

FIG. 2 illustrates a configuration example of a display apparatus of an embodiment to which the present technology is applied.

A display apparatus 1 is a self-luminous display apparatus such as an OLED display apparatus including an OLED display panel. The display apparatus 1 is configured as a television receiver or the like.

In FIG. 2, the display apparatus 1 includes a signal input unit 110, a signal processing unit 111, a panel driving unit 112, and a panel unit 113.

The signal input unit 110 includes a tuner connected to an antenna, a communication module that can be connected to the Internet or other communication networks, an input interface conforming to predetermined standards, or the like.

The signal input unit 110 supplies, to the signal processing unit 111, video signals of various types of content such as broadcasting content that is transmitted by terrestrial broadcasting or satellite broadcasting, communication content that is delivered by streaming via the Internet or other communication networks, or recorded content recorded on a recoding medium such as an optical disc or a semiconductor memory or a recorder.

The signal processing unit 111 performs video signal processing on a video signal of content supplied from the signal input unit 110 and supplies the thus obtained video signal to the panel driving unit 112. In the video signal processing, luminance enhancement processing for changing a video signal from a low luminance display signal (low luminance signal) to a high luminance display signal (high luminance signal) or the like is carried out.

The panel driving unit 112 drives the panel unit 113 according to a video signal supplied from the signal processing unit 111.

The panel unit 113 includes a display panel such as an OLED display panel. The panel unit 113 is driven by the panel driving unit 112 to display video based on video signals of various types of content.

An OLED display panel is a display panel in which pixels including OLED elements that are self-luminous elements are two-dimensionally arranged. An OLED (Organic Light Emitting Diode) is a light-emitting element having a structure in which an organic luminescent material is sandwiched between a cathode and an anode and forms each of pixels (display pixels) two-dimensionally arranged in an OLED display panel.

In a WRGB OLED panel, each pixel (display pixel) includes four sub pixels of white (W), red (R), green (G), and blue (B). In an RGB OLED panel, each pixel (display pixel) includes three sub pixels of red (R), green (G), and blue (B).

Note that, in the configuration illustrated in FIG. 2, for the sake of simple description, the bare minimum constituent units are illustrated, but other circuits or devices such as a sound signal processing circuit configured to process sound signals or a speaker configured to output sound based on sound signals may also be included.

Figure 3:
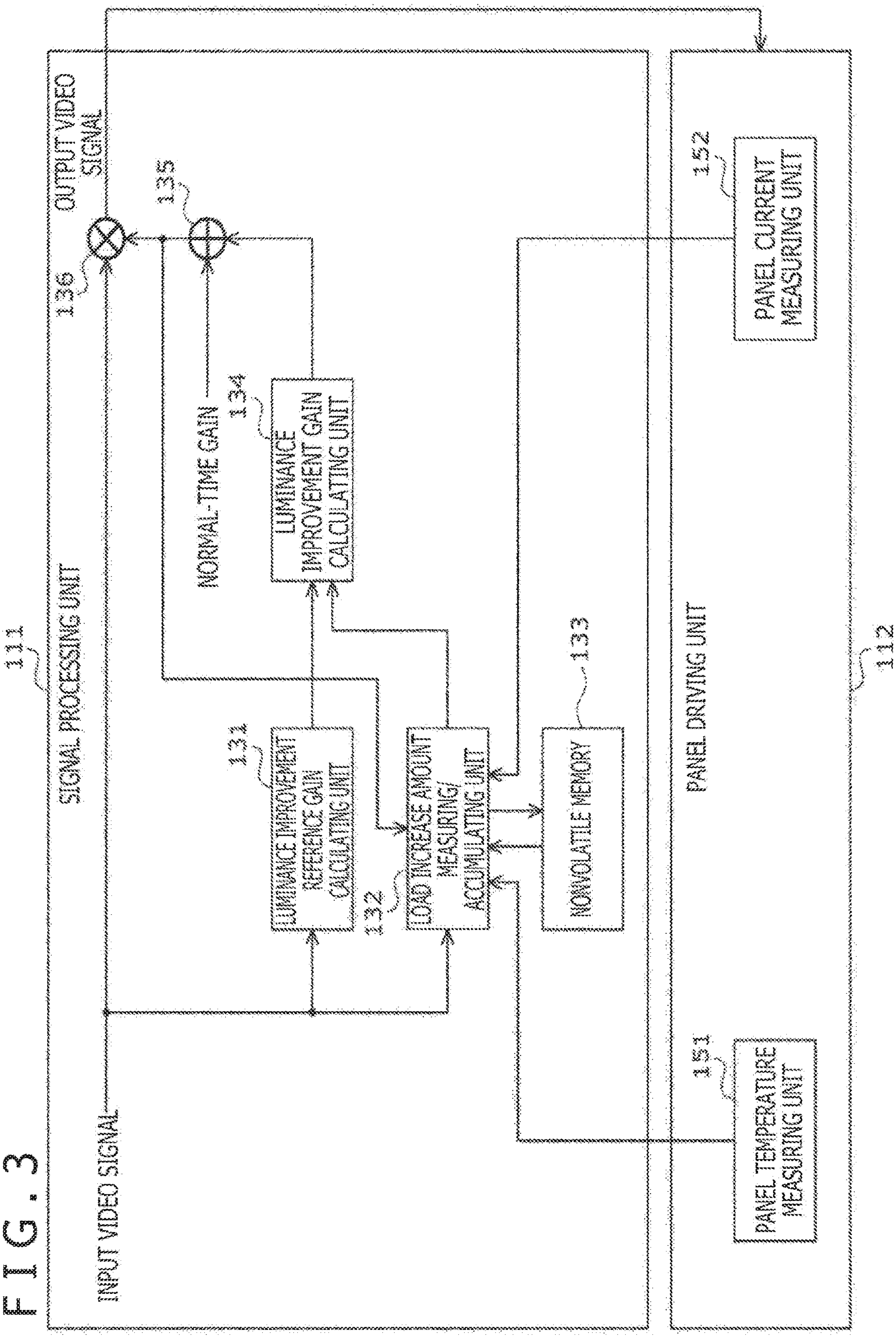
FIG. 3 is a block diagram illustrating a detailed configuration example of a signal processing unit.

FIG. 3 illustrates a detailed configuration example of the signal processing unit 111 of FIG. 2.

In FIG. 3, the signal processing unit 111 includes a luminance improvement reference gain calculating unit 131, a load increase amount measuring/accumulating unit 132, a nonvolatile memory 133, a luminance improvement gain calculating unit 134, an addition unit 135, and a multiplication unit 136.

In the signal processing unit 111, an input video signal from the signal input unit 110 is supplied to each of the luminance improvement reference gain calculating unit 131, the load increase amount measuring/accumulating unit 132, and the multiplication unit 136.

The luminance improvement reference gain calculating unit 131 performs luminance improvement reference gain calculation processing according to a video signal input thereto and supplies the thus obtained luminance improvement reference gain to the luminance improvement gain calculating unit 134. A luminance improvement reference gain is a gain that is used as a reference for luminance improvement gain calculation.

The load increase amount measuring/accumulating unit 132 performs accumulated additional value calculation processing and accumulation processing according to a video signal input thereto and a fold improvement in luminance and supplies the thus obtained accumulated value of accumulated load increase amounts to the luminance improvement gain calculating unit 134. As a fold improvement in luminance, a fold improvement in luminance based on a gain by which an input video signal is multiplied is fed back to be input.

The details of accumulated additional value calculation processing and accumulation processing are described later with reference to FIG. 4 to FIG. 6. To store accumulated value data in performing accumulation processing, the non-volatile memory 133 such as an EEPROM (Electrically Erasable Programmable Read Only Memory) is provided.

Further, the load increase amount measuring/accumulating unit 132 can perform accumulated additional value calculation processing by taking into account at least one of the measurement result of the surface temperature of the display panel and the measurement result of a current flowing through the display panel, which are supplied from the panel driving unit 112.

The luminance improvement gain calculating unit 134 receives a luminance improvement reference gain supplied from the luminance improvement reference gain calculating unit 131 and the accumulated value of accumulated load increase amounts supplied from the load increase amount measuring/accumulating unit 132.

The luminance improvement gain calculating unit 134 performs luminance improvement gain calculation processing in reference to the luminance improvement reference gain and the accumulated value of accumulated load increase amounts and supplies the thus obtained luminance improvement gain to the addition unit 135.

In the luminance improvement gain calculation processing, as a luminance improvement gain, a value is calculated by multiplying a luminance improvement reference gain by a gain linked to the accumulated value of accumulated load increase amounts (hereinafter referred to as an "accumulated load increase amount-linked gain"). The details of luminance improvement gain calculation processing are described later with reference to FIG. 9.

The addition unit 135 adds a luminance improvement gain from the luminance improvement gain calculating unit 134 and a normal-time gain together and supplies the thus obtained luminance enhancement gain to the multiplication unit 136.

A normal-time gain is a gain by which an input video signal is multiplied and is a gain for changing an input video signal to a high luminance display signal. For example, as a normal-time gain, a gain with which luminance enhancement can always be carried out without causing problematic element deterioration in the usage period of the display panel is set.

Here, an additional luminance improvement gain is added to a normal-time gain to further enhance the luminance of an input video signal. The additional luminance improvement gain is adaptively controlled according to the measurement result of an accumulated load increase amount, the measurement result of the surface temperature of the display panel, and the measurement result of a current load on the display panel.

The multiplication unit 136 multiplies an input video signal by a luminance enhancement gain from the addition unit 135 and supplies the thus obtained output video signal to the panel driving unit 112.

In FIG. 3, the panel driving unit 112 can include a panel temperature measuring unit 151 and a panel current measuring unit 152.

The panel temperature measuring unit 151 includes temperature sensors or the like provided on the panel unit 113. The panel temperature measuring unit 151 measures the surface temperature of the display panel and supplies the measurement result to the load increase amount measuring/accumulating unit 132 of the signal processing unit 111. Configuration examples of the temperature sensors are described later with reference to FIG. 7 and FIG. 8.

The panel current measuring unit 152 includes a current sensor or the like provided on the panel unit 113. The panel current measuring unit 152 measures a current applied to the display panel and supplies the measurement result to the load increase amount measuring/accumulating unit 132 of the signal processing unit 111.

Note that, the configuration of the signal processing unit 111 illustrated in FIG. 3 is an example, and the bare minimum constituent units thereof can form a configuration that does not use measurement results from the panel temperature measuring unit 151 and the panel current measuring unit 152. Even with such a configuration, the amounts of increase in load on the display panel caused by luminance enhancement can be accumulated and the additional luminance improvement gain can be controlled to prevent the elements from being deteriorated too much. Further, with the configuration that uses measurement results from the panel temperature measuring unit 151 and the panel current measuring unit 152, the accuracy can be more increased.

(Calculation of Luminance Improvement Reference Gain)

How the luminance improvement reference gain calculating unit 131 calculates a luminance improvement reference gain is not limited to anything specific, and the luminance improvement reference gain calculating unit 131 may calculate a fixed gain or a gain that changes according to some information, for example.

However, with an additional luminance improvement gain, a current load is increased to achieve luminance enhancement, and the effect of display panel burn-in is thus large; accordingly, the processing of limiting the length of time of performing luminance enhancement processing on the same place (region) is desirably carried out as in luminance enhancement processing illustrated in FIG. 1 to which the luminance enhancement technology is applied.

(Measurement/Accumulation of Load Increase Amounts)

As described above in the abovementioned problem, mere measurement of a luminance improvement period causes problematic deterioration in element of a display panel, since there is no limit on the accumulated luminance improvement time that is increased along with the continuous use of the display panel over a long period of time. Accordingly, there is a need to accumulate the amounts of increase in load caused by luminance enhancement processing and perform feedback control for the luminance improvement gain to prevent the elements from being deteriorated to a level greater than a certain level due to the processing.

Figure 4:
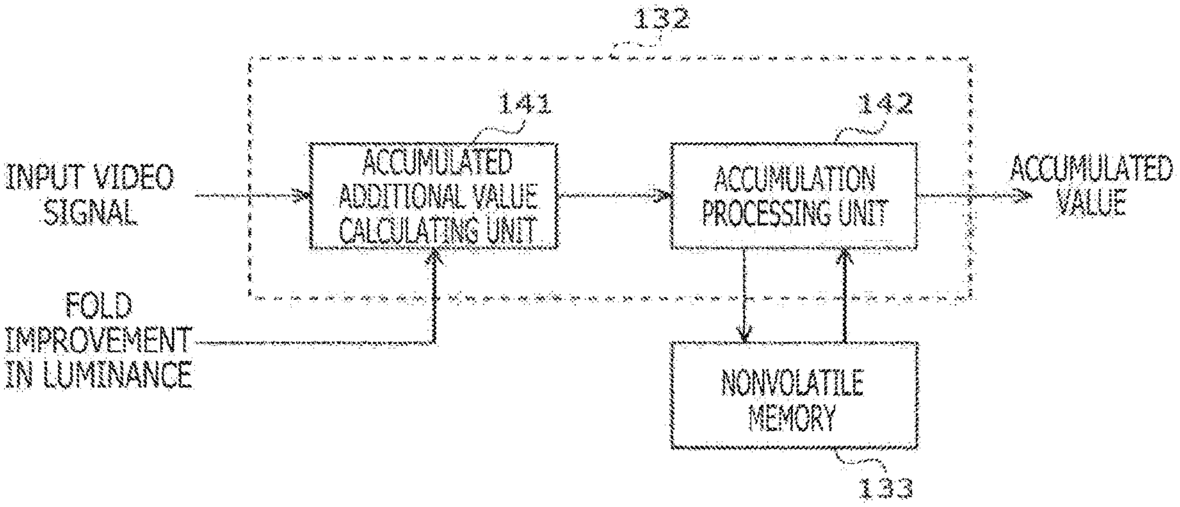
FIG. 4 is a diagram illustrating an example of how a load increase amount measuring/accumulating unit measures/accumulates load increase amounts.
Figure 5:
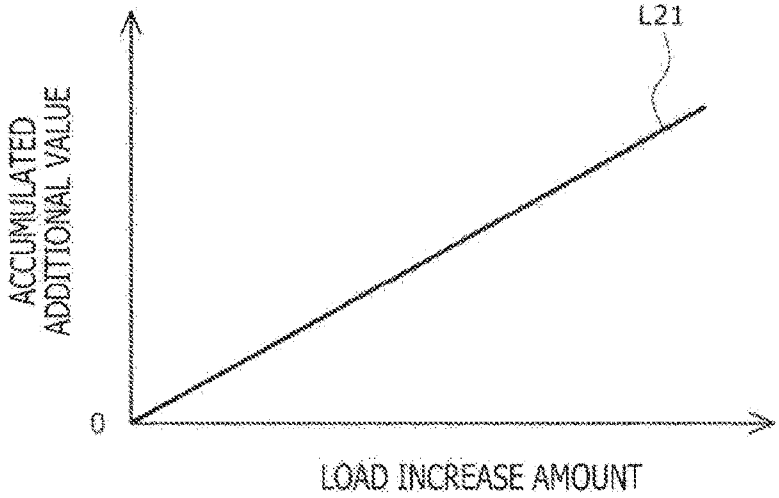
FIG. 5 is a diagram illustrating a first exemplary accumulated additional value based on a load increase amount.

FIG. 4 illustrates an example of how the load increase amount measuring/accumulating unit 132 measures load increase amounts. In FIG. 4, the load increase amount measuring/accumulating unit 132 includes an accumulated additional value calculating unit 141 and an accumulation processing unit 142.

The accumulated additional value calculating unit 141 receives an input video signal and a fold improvement in luminance. The accumulated additional value calculating unit 141 calculates an additional value for accumulation processing based on an increase in load caused by luminance enhancement processing.

In the accumulated additional value calculation processing, an accumulated additional value can be correlated with an element deterioration amount or an accumulated additional value can be correlated with a luminance improvement time. FIG. 5 in which the horizontal axis indicates load increase amounts and the vertical axis indicates accumulated additional values illustrates, by a thick line L21, a relation in a case where an accumulated additional value is correlated with an element deterioration amount. In FIG. 5, the thick line L21 has such a relation that as the load increase amount is increased, the accumulated additional value is increased with a predetermined gradient, and the higher the load is, the larger the additional value is. That is, in this example, a larger additional value is calculated for a higher load to make a correlation with an element deterioration amount.

Figure 6:
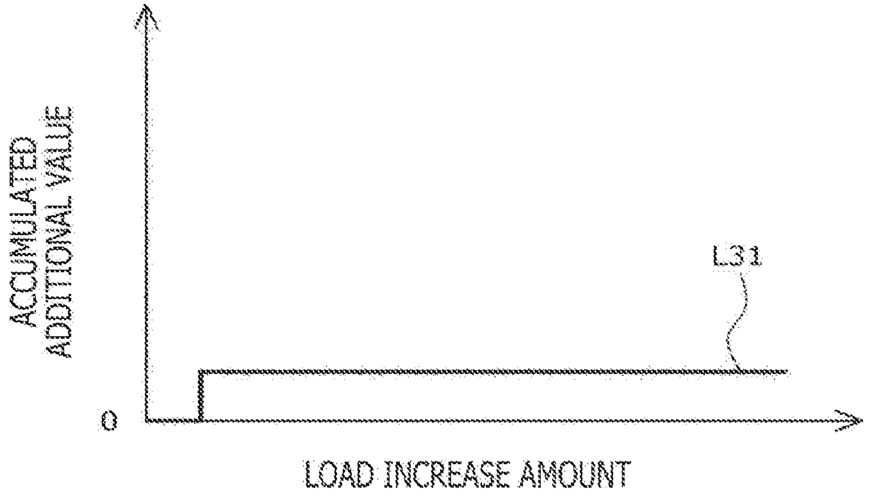
FIG. 6 is a diagram illustrating a second exemplary accumulated additional value based on a load increase amount.

FIG. 6 in which the horizontal axis indicates load increase amounts and the vertical axis indicates accumulated additional values illustrates, by a thick line L31, a relation in a case where an accumulated additional value is correlated with a luminance improvement time. In FIG. 6, the thick line L31 has such a relation that the accumulated additional value has a constant value according to an increase in load increase amount, and the additional value is constant irrespective of the load. That is, in this example, a constant additional value is calculated to measure a length of time in which luminance enhancement processing has been carried out.

The accumulation processing unit 142 adds together an additional value of each image frame calculated by accumulated additional value calculation processing, to thereby calculate the accumulated value of load increase amounts (accumulated load increase amount). Further, the accumulation processing unit 142 writes or reads accumulated value data to or from the nonvolatile memory 133 such as an EEPROM to keep the accumulated value when the display apparatus 1 is powered off.

The accumulation processing unit 142 carries out accumulation processing on each predetermined region on the screen of the display panel to calculate the accumulated value of each predetermined region in question, thereby making it possible to determine how long luminance enhancement processing has been carried out on the same place (region). Then, the luminance improvement gain calculating unit 134 can control the additional luminance improvement gain in reference to the accumulated load increase amount.

Note that, as a region on the screen of the display panel, for example, a region obtained by dividing the region of the entire screen into multiple regions having predetermined longitudinal and lateral dimensions can be used. Specifically, for example, a region corresponding to a divided region A of FIG. 8 described later can be used.

(Measurement of Panel Temperature)

The load increase amount measuring/accumulating unit 132 performs load prediction by signal processing without using information regarding deterioration characteristics that change depending on temperature. Thus, the accuracy can be improved by carrying out video load prediction by signal processing or measuring an actual surface temperature of the display panel by temperature sensors or the like and taking information regarding the thus obtained temperature into account for the accumulated additional value of each predetermined region on the screen of the display panel.

Only one temperature sensor may be installed on the panel unit 113 to obtain supplementary information for load prediction by signal processing or multiple temperature sensors may be installed on the panel unit 113 for the purpose of improving the accuracy of supplementary information or directly measuring a temperature without performing load prediction by signal processing.

Figure 7:
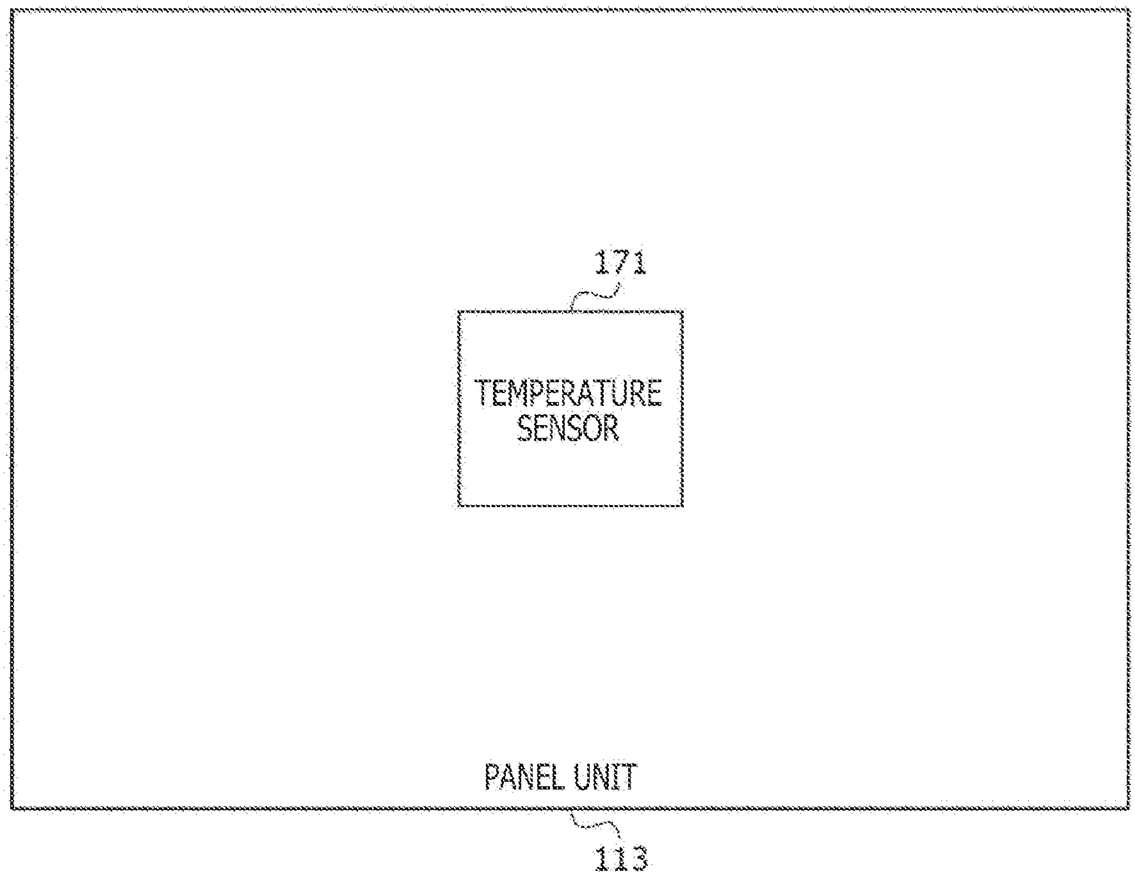
FIG. 7 is a diagram illustrating a configuration example including a single temperature sensor provided on a panel unit.

FIG. 7 illustrates a configuration example including a single temperature sensor provided on the panel unit 113. In FIG. 7, a temperature sensor 171 is installed at a location corresponding to the substantially center portion of the screen of the display panel and measures the surface temperature of the display panel. Note that, the temperature sensor 171 may be installed at a location other than the location corresponding to the substantially center portion of the screen of the display panel.

Figure 8:
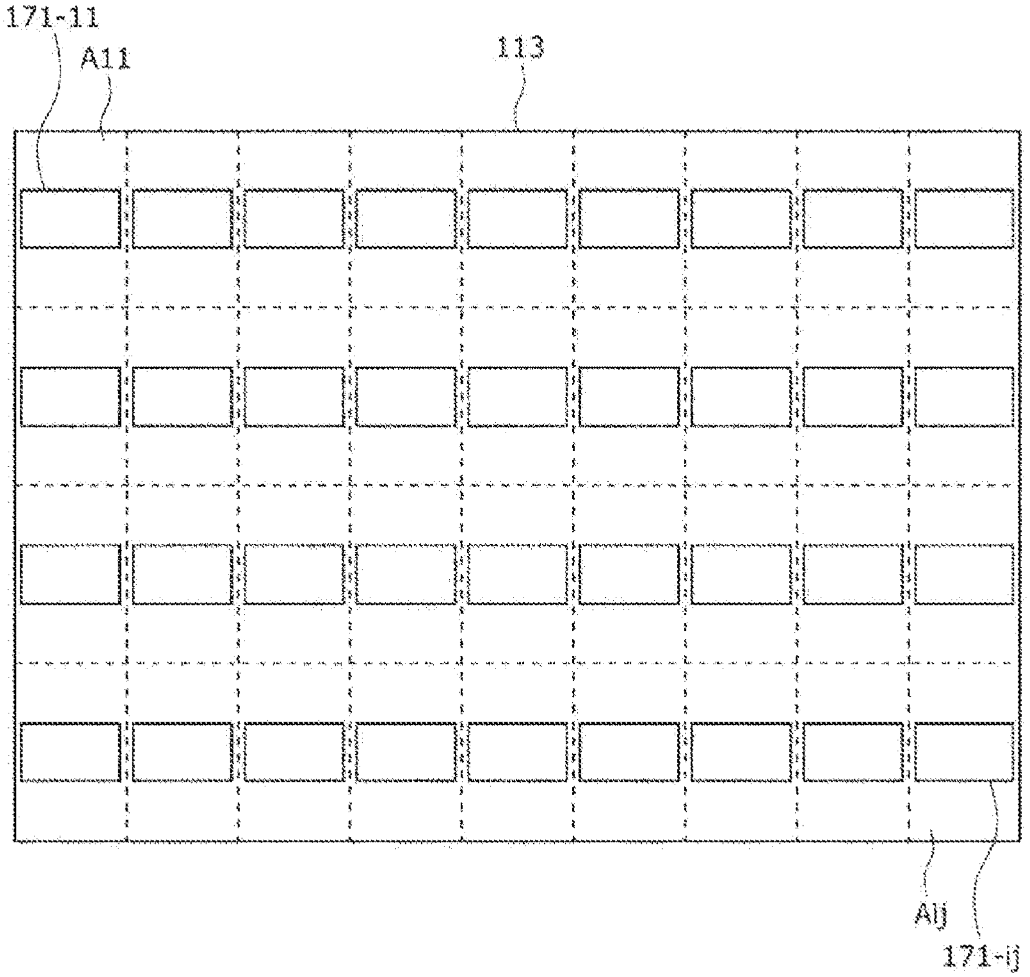
FIG. 8 is a diagram illustrating a configuration example including multiple temperature sensors provided on the panel unit.

FIG. 8 illustrates a configuration example including multiple temperature sensors provided on the panel unit 113. FIG. 8 illustrates the example in which the region of the entire screen of the display panel is divided into 4×9 regions that are the same in longitudinal and lateral dimensions and the temperature sensor 171 is installed in each divided region. Note that, for the convenience of description, on the screen of the display panel, the dashed lines indicating the boundaries between the divided regions are illustrated.

In FIG. 8, the numbers corresponding to the longitudinal direction and lateral direction of the divided region A are described in an upper-left divided region A11 and a lower-right divided region Aij on the screen of the display panel. Further, the numbers corresponding to the longitudinal direction and lateral direction of the temperature sensor 171 are described in an upper-left temperature sensor 171-11 and a lower-right temperature sensor 171-*ij*.

However, in those representations, i indicates the number in the longitudinal direction, and j indicates the number in the lateral direction. In other words, although FIG. 8 illustrates the example in which the screen of the display panel is divided into the 4×9 divided regions, the screen of the display panel can be divided into i×j (i and j: integer of 1 or more) divided regions A, and the number of the divided regions A in which the temperature sensor 171 is installed is optionally determined.

In FIG. 8, the temperature sensor 171-11 measures the surface temperature of the divided region A11 of the entire screen of the display panel. The temperature sensor 171-*ij* other than the temperature sensor 171-11 also measures the surface temperature of the divided region Aij corresponding to the installation location, the description of which is omitted to avoid repetition.

The temperature sensor 171 of FIG. 7 and the temperature sensors 171-11 to 171-*ij* of FIG. 8 correspond to the panel temperature measuring unit 151 of FIG. 3. In the case where the multiple temperature sensors 171-11 to 171-*ij* are installed, as compared to the case where the single temperature sensor 171 is installed, the surface temperature of the display panel can be measured more accurately.

(Measurement of Current Load)

An improvement in accuracy of the measurement of a load increase amount can be expected by measurement of a current actually flowing through the display panel by a current sensor or the like in addition to load prediction by signal processing. For example, the current sensor can be provided on the display panel itself or a power supply board configured to generate a voltage for driving the display panel.

(Calculation of Luminance Improvement Gain)

The luminance improvement gain calculating unit 134 can reduce, when luminance enhancement processing has been carried out over a long period of time and the accumulated load increase amount is thus high, the luminance improvement gain, to thereby reduce the effect of element deterioration caused by luminance enhancement processing in the usage period.

That is, the luminance improvement gain calculating unit 134 performs control for reducing a luminance improvement gain when the accumulated value of load increase amounts exceeds a predetermined value in a case where luminance enhancement processing has been carried out over a period longer than a predetermined period. The luminance improvement gain calculating unit 134 sets a value obtained by multiplying a luminance improvement reference gain by an accumulated load increase amount-linked gain, as an ultimate luminance improvement gain.

Figure 9:
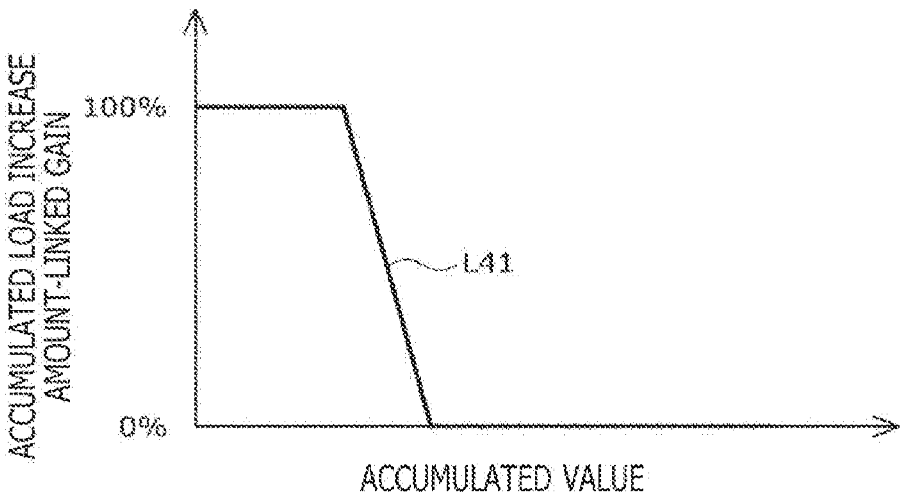
FIG. 9 is a diagram illustrating an example of how to set a gain relative to an accumulated load increase amount.

FIG. 9 illustrates how to set a gain relative to an accumulated load increase amount. In FIG. 9, the horizontal axis indicates accumulated value, and the vertical axis indicates accumulated load increase amount-linked gain.

In FIG. 9, the gain based on the accumulated load increase amount is indicated by a thick line L41 including the straight line downward to the right. The accumulated load increase amount-linked gain is maintained at 100% until the accumulated value reaches a predetermined value and gradually decreased with a predetermined gradient after the accumulated value exceeds the predetermined value. The accumulated load increase amount-linked gain is maintained at 0% after reaching 0%.

For example, the luminance improvement gain calculating unit 134 can control, with an accumulated load increase amount-linked gain, a luminance improvement gain for the entire screen according to the maximum value of the accumulated value of each predetermined region on the screen of the display panel. Further, the luminance improvement gain calculating unit 134 can control, with an accumulated load increase amount-linked gain, a luminance improvement gain for each predetermined region on the screen of the display panel according to the accumulated value of each predetermined region in question.

Note that, also in this case, a region on the screen of the display panel can be, for example, a region obtained by dividing the region of the entire screen into multiple regions having predetermined longitudinal and lateral dimensions. Specifically, a region corresponding to the divided region A of FIG. 8 described above can be used, for example.

(Adaptive Gain Control)

Figure 10:
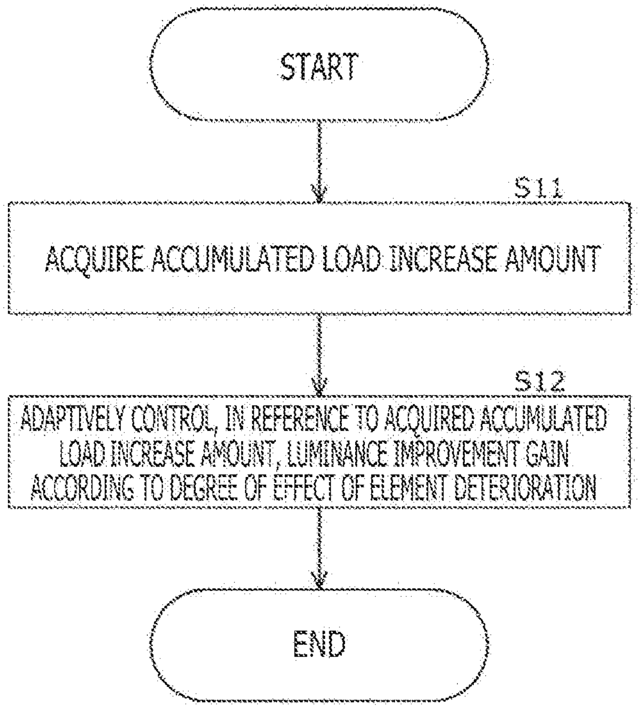
FIG. 10 is a flowchart illustrating the flow of luminance improvement gain control processing.

FIG. 10 is a flowchart illustrating the flow of luminance improvement gain control processing that is carried out by the signal processing unit 111.

In Step S11, the luminance improvement gain calculating unit 134 acquires an accumulated load increase amount t from the load increase amount measuring/accumulating unit 132.

The accumulated load increase amount is the accumulated value of load increase amounts obtained by measuring and accumulating the amounts of increase in load on the display panel caused by luminance enhancement. The accumulated load increase amount may take into account supplementary information such as the measurement result of the surface temperature of the display panel or the measurement result of a current flowing through the display panel.

In Step S12, the luminance improvement gain calculating unit 134 adaptively controls, in reference to the acquired accumulated load increase amount, a luminance improvement gain according to the degree of effect of deterioration in element of the display panel.

For example, the luminance improvement gain calculating unit 134 performs control for reducing a luminance improvement gain when luminance enhancement processing has been carried out over a long period of time and the accumulated load increase amount is thus high and sets a value obtained by multiplying a luminance improvement reference gain by an accumulated load increase amount-linked gain, as an ultimate luminance improvement gain.

As described above, in changing a video signal from a low luminance display signal to a high luminance display signal by luminance enhancement, the signal processing unit 111 adaptively controls, in reference to an accumulated load increase amount obtained by measuring and accumulating the amounts of increase in load on the display panel, a luminance improvement gain according to the degree of effect of an element deterioration.

This can solve the problem in terms of the long-term reliability of a display panel such as burn-in caused by problematic element deterioration that occurs in enhancing the luminance of the display panel and can thereby reduce the effect of deterioration in element of the display panel. In the case of an OLED display panel, the elements of the display panel are the OLED elements of the two-dimensionally arranged pixels, for example.

2. Modified Example

In the above description, the signal processing unit 111 is the component of the display apparatus 1, but the signal processing unit 111 may be regarded as a single apparatus, that is, a signal processing apparatus.

In the case exemplified above, the display apparatus 1 is the television receiver, but the display apparatus 1 is not limited thereto and may be equipment such as display equipment. Examples of the display equipment include medical monitors, broadcast monitors, and digital signage displays.

Further, the display apparatus 1 may be used as a display unit for a PC (Personal Computer), a tablet device, a smartphone, a cell phone, a game console, a head-mounted display, an in-vehicle device such as a car navigation system or a rear-seat monitor, or a wearable device such as a wristwatch or a glass device.

In the above description, the OLED display apparatus including the OLED display panel has been exemplified as the display apparatus 1, but the present technology is also applicable to display apparatuses such as other self-luminous display apparatuses including self-luminous display panels.

In the case described above, the pixels two-dimensionally arranged on (the display panel of) the panel unit 113 each include the four sub pixels of white (W), red (R), green (G), and blue (B), but the colors of the sub pixels are not limited to those. For example, in each pixel, instead of the white (W) sub pixel, a sub pixel of another color as high in luminosity factor as white (W) may be used.

Note that, herein, "OLED" may be replaced with "organic EL (Electro Luminescence)." For example, it can be said that the OLED display apparatus is an organic EL display apparatus. Further, "video" may be replaced with "image" since video includes multiple image frames.

Note that, the embodiment of the present technology is not limited to the embodiment described above, and various modifications can be made within the scope of the gist of the present technology.

Further, the effects described herein are only exemplary and not limitative, and other effects may be provided.

Note that, the present technology can take the following configurations.

(1) A signal processing apparatus including:

a signal processing unit configured to acquire, in changing a video signal from a low luminance display signal to a high luminance display signal by luminance enhancement, an accumulated load increase amount obtained by measuring and accumulating amounts of increase in load on a display panel caused by luminance enhancement, and adaptively control, in reference to the accumulated load increase amount acquired, a first gain for improving luminance of the video signal, according to a degree of effect of deterioration in element of the display panel.

(2) The signal processing apparatus according to Item (1), in which the signal processing unit acquires the accumulated load increase amount in which information regarding a surface temperature of the display panel is taken into account.

(3) The signal processing apparatus according to Item (1) or (2), in which the signal processing unit acquires the accumulated load increase amount in which information regarding a current flowing through the display panel is taken into account.

(4) The signal processing apparatus according to any one of Items (1) to (3), in which the signal processing unit additionally adds the first gain to a second gain that is used for luminance enhancement, to thereby enhance the luminance of the video signal.

(5) The signal processing apparatus according to Item (4), in which the signal processing unit uses, as the first gain, a value based on a third gain linked to the accumulated load increase amount.

(6) The signal processing apparatus according to Item (5), in which the signal processing unit uses, as the first gain, a value obtained by multiplying the third gain by a fourth gain that is used as a reference for luminance improvement.

(7) The signal processing apparatus according to any one of Items (1) to (6), in which the signal processing unit is configured to calculate, according to the load that is increased due to luminance enhancement, an additional value for accumulation, and add together the additional value calculated of each image frame to calculate an accumulated value of load increase amounts.

(8) The signal processing apparatus according to Item (7), in which the signal processing unit calculates a larger additional value for a higher load to make a correlation with an element deterioration amount.

(9) The signal processing apparatus according to Item (7), in which the signal processing unit calculates a constant additional value to measure a length of time in which luminance enhancement has been carried out.

(10) The signal processing apparatus according to any one of Items (7) to (9), further including:

a memory configured to store data regarding the accumulated value.

(11) The signal processing apparatus according to any one of Items (7) to (10), in which the signal processing unit calculates the accumulated value of load increase amounts of each of predetermined regions on a screen of the display panel.

(12) The signal processing apparatus according to any one of Items (1) to (11), in which the signal processing unit performs control for reducing the first gain when an accumulated value of load increase amounts exceeds a predetermined value in a case where luminance enhancement has been carried out over a period longer than a predetermined period.

(13) The signal processing apparatus according to Item (12), in which the signal processing unit controls, according to a maximum value of the accumulated value of each of predetermined regions on a screen of the display panel, the first gain for an entirety of the screen.

(14) The signal processing apparatus according to Item (12), in which the signal processing unit controls, according to the accumulated value of each of predetermined regions on a screen of the display panel, the first gain for each of the predetermined regions.

(15) The signal processing apparatus according to Item (2), in which the display panel is provided with one or multiple temperature sensors configured to measure the surface temperature.

(16) A signal processing method including:

by a signal processing apparatus, acquiring, in changing a video signal from a low luminance display signal to a high luminance display signal by luminance enhancement, an accumulated load increase amount obtained by measuring and accumulating amounts of increase in load on a display panel caused by luminance enhancement; and adaptively controlling, in reference to the accumulated load increase amount acquired, a first gain for improving luminance of the video signal, according to a degree of effect of deterioration in element of the display panel.

(17) A display apparatus including:

a signal processing unit configured to process a video signal; and a panel unit including a display panel configured to display video based on the video signal, in which the signal processing unit is configured to acquire, in changing the video signal from a low luminance display signal to a high luminance display signal by luminance enhancement, an accumulated load increase amount obtained by measuring and accumulating amounts of increase in load on the display panel caused by luminance enhancement, and adaptively control, in reference to the accumulated load increase amount acquired, a first gain for improving luminance of the video signal, according to a degree of effect of deterioration in element of the display panel.

(18) The display apparatus according to Item (17), in which the panel unit includes an OLED display panel.

REFERENCE SIGNS LIST

1: Display apparatus
110: Signal input unit
111: Signal processing unit
112: Panel driving unit
113: Panel unit
131: Luminance improvement reference gain calculating unit
132: Load increase amount measuring/accumulating unit
133: Nonvolatile memory
134: Luminance improvement gain calculating unit
135: Addition unit
136: Multiplication unit
141: Accumulated additional value calculating unit
142: Accumulation processing unit
151: Panel temperature measuring unit
152: Panel current measuring unit
171: Temperature sensor

The invention claimed is:

1. A display apparatus comprising:

a signal processing circuitry configured to process a video signal; and a display panel configured to display video based on the video signal, wherein the signal processing circuitry is configured to:

acquire an accumulated load increase amount based on amounts of increase in load on the display panel caused by luminance enhancement, control luminance of the video signal in reference to the accumulated load increase amount acquired, and limit a length of time of performing luminance enhancement.

2. The display apparatus according to claim 1, further comprising an input interface configured to receive broadcast content, communication content, or recorded content.

3. The display apparatus according to claim 1, wherein the signal processing circuitry is configured to acquire the accumulated load increase amount based on a current flowing through the display panel.

4. The display apparatus according to claim 1, wherein the display apparatus is a television.

5. The display apparatus according to claim 1, wherein the signal processing circuitry is further configured to:

add a first gain for improving luminance of the video signal to a second gain that is used for luminance enhancement to enhance the luminance of the video signal, and use, as the first gain, a value based on a third gain linked to the accumulated load increase amount.

6. The display apparatus according to claim 5, wherein the signal processing circuitry is configured to use, as the first gain, a value obtained by multiplying the third gain by a fourth gain that is used as a reference for luminance improvement.

7. The display apparatus according to claim 5, wherein the signal processing circuitry is configured to perform control for reducing the first gain when an accumulated value of load increase amounts exceeds a predetermined value in a case where luminance enhancement has been carried out over a period longer than a predetermined period.

8. The display apparatus according to claim 5, wherein the signal processing circuitry is configured to control, according to a maximum value of the accumulated value of each of predetermined regions on a screen of the display panel, the first gain for an entirety of the screen.

9. The display apparatus according to claim 5, wherein the signal processing circuitry is configured to control, according to the accumulated value of each of predetermined regions on a screen of the display panel, the first gain for each of the predetermined regions.

10. The display apparatus according to claim 1, wherein the signal processing circuitry is configured to:

calculate, according to the load that is increased due to luminance enhancement, an additional value for accumulation, and add together the additional value calculated of each image frame to calculate an accumulated value of load increase amounts.

11. The display apparatus according to claim 10, wherein the signal processing circuitry is configured to calculate a larger additional value for a higher load to make a correlation with an element deterioration amount.

12. The display apparatus according to claim 10, wherein the signal processing circuitry is configured to calculate a constant additional value to measure a length of time in which luminance enhancement has been carried out.

13. The display apparatus according to claim 10, further comprising a memory configured to store data regarding the accumulated value.

14. The display apparatus according to claim 10, wherein the signal processing circuitry is configured to calculate the accumulated value of load increase amounts of each of predetermined regions on a screen of the display panel.

15. The display apparatus according to claim 1, wherein the signal processing circuitry is configured to acquire the accumulated load increase amount based on a surface temperature of the display panel.

16. The display apparatus according to claim 15, wherein the display panel is provided with one or multiple temperature sensors configured to measure the surface temperature.

17. The display apparatus according to claim 1, wherein the display panel is a self-luminous display panel.

18. The display apparatus according to claim 17, wherein the display panel includes display pixels each including white, red, green and blue sub pixels.

19. The display apparatus according to claim 1, wherein the display panel is an OLED display panel.

20. The display apparatus according to claim 19, wherein the display panel includes display pixels each including red, green and blue sub pixels.

* * * * *